United States Patent
Watanabe et al.

(10) Patent No.: US 8,038,784 B2
(45) Date of Patent: Oct. 18, 2011

(54) NON-AQUEOUS PIGMENT INK AND NON-AQUEOUS PIGMENT INK SET

(75) Inventors: Yoshifumi Watanabe, Ibaraki-ken (JP); Toshihiro Endo, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 199 days.

(21) Appl. No.: 12/382,783

(22) Filed: Mar. 24, 2009

(65) Prior Publication Data

US 2009/0281219 A1    Nov. 12, 2009

(30) Foreign Application Priority Data

May 9, 2008  (JP) ............................... P2008-123689

(51) Int. Cl.
  *C09D 11/02*  (2006.01)
(52) U.S. Cl. .................. 106/31.74; 106/31.86
(58) Field of Classification Search ............... 106/31.74, 106/31.86
See application file for complete search history.

(56) References Cited

U.S. PATENT DOCUMENTS

| 5,973,027 | A | 10/1999 | Howald et al. |
| 6,053,438 | A | 4/2000 | Romano, Jr. et al. |
| 6,153,667 | A * | 11/2000 | Howald ............... 523/160 |
| 2007/0101901 | A1 * | 5/2007 | Endo et al. ............... 106/31.86 |

FOREIGN PATENT DOCUMENTS

| EP | 1 911 815 A1 | 4/2008 |
| JP | P2003-261808 A | 9/2003 |
| JP | P2007-126564 A | 5/2007 |

* cited by examiner

*Primary Examiner* — Jerry A Lorengo
*Assistant Examiner* — Veronica F Faison
(74) *Attorney, Agent, or Firm* — The Nath Law Group; Joshua B. Goldberg; Tanya E. Harkins

(57) ABSTRACT

A non-aqueous pigment ink comprising a pigment, a pigment dispersant and a non-aqueous solvent, wherein the pigment dispersant comprises a copolymer of vinylpyrrolidone and an alkene of 10 to 40 carbon atoms.

5 Claims, No Drawings

NON-AQUEOUS PIGMENT INK AND NON-AQUEOUS PIGMENT INK SET

CROSS REFERENCE TO RELATED APPLICATIONS

This Application is based upon and claims the benefit of priority from prior Japanese Patent Application No. 2008-123689 filed on May 9, 2008; the entire contents of which are incorporated by reference herein.

TECHNICAL FIELD

The present invention relates to a non-aqueous pigment ink and a non-aqueous pigment ink set.

BACKGROUND ART

An inkjet recording system is a printing system in which printing is conducted by spraying a liquid ink with a high degree of fluidity from very fine nozzles, and adhering that ink to a recording medium such as a sheet of paper. These systems enable the printing of high-resolution, high-quality images at high speed and with minimal noise, using a comparatively inexpensive printing apparatus, and are rapidly becoming widespread.

The coloring materials for the inks used in these inkjet recording systems can be broadly classified into materials that use pigments and materials that use dyes. Of these, there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. Non-aqueous inks that do not use water as the ink solvent, including solvent-based inks that use a volatile solvent as the main constituent and oil-based inks that use a non-volatile solvent as the main constituent, exhibit superior stability within the printer (such as intermittent dischargeability and discharge recovery following standing idle for a long period), cause no curling of the printed paper and have a short ink penetration and drying time, and are therefore attracting considerable attention.

[Patent Document 1] Japanese Patent Laid-Open No. 2003-261808

[Patent Document 2] Japanese Patent Laid-Open No. 2007-126564

DISCLOSURE OF INVENTION

However, non-aqueous inks of these conventional technologies are sometimes unable to produce satisfactory image density (print density), depending on the type of printing paper being used.

Accordingly, an object of the present invention is to provide a non-aqueous pigment ink capable of producing favorable image density.

According to one aspect of the present invention, there is provided a non-aqueous pigment ink comprising a pigment, a pigment dispersant and a non-aqueous solvent, wherein
  the pigment dispersant comprises a copolymer of vinylpyrrolidone and an alkene of 10 to 40 carbon atoms.

According to another aspect of the present invention, there is provided a non-aqueous pigment ink set, comprising:
  a first ink comprising a first pigment, a first pigment dispersant and a first non-aqueous solvent, wherein
    the first pigment comprises carbon black, and
    the first pigment dispersant comprises a copolymer of vinylpyrrolidone and an alkene of 10 to 40 carbon atoms; and
  a second ink comprising a second pigment, a second pigment dispersant and a second non-aqueous solvent, wherein
    the second pigment comprises a cyan, magenta or yellow pigment, and
    the second pigment dispersant comprises a nitrogen-containing graft copolymer having polyester side chains.

BEST MODE FOR CARRYING OUT THE INVENTION

A non-aqueous pigment ink according to the present invention (hereafter also referred to as simply "the ink") uses a specific pigment dispersant. By using this ink, favorable image density can be achieved for papers having all manner of ash contents (namely, percentages of added fillers).

A non-aqueous pigment ink set according to the present invention combines a plurality of inks comprising specific pigments and pigment dispersants, and by using this ink set, the image density of the printed item, and particularly the black density, can be further improved.

The ink according to the present invention comprises, as essential components, a pigment, a pigment dispersant, and a non-aqueous solvent.

This ink may be any color, and examples of pigments that can be used include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. These pigments may be used either alone, or in combinations of two or more different pigments.

From the viewpoint of ensuring favorable dispersibility and storage stability, the average particle size of the pigment is preferably not more than 300 nm, and is more preferably 150 nm or smaller. In this description, the average particle size of the pigment refers to the value measured using a dynamic light-scattering particle size distribution measurement apparatus LB-500 manufactured by Horiba, Ltd.

The quantity of the pigment within the ink is typically within a range from 0.01 to 20% by weight, and from the viewpoints of print density and ink viscosity, is preferably within a range from 3 to 15% by weight.

The ink according to the present invention comprises, as the pigment dispersant (hereafter also referred to as simply "the dispersant"), a copolymer of vinylpyrrolidone (VP) and an alkene of 10 to 40 carbon atoms (hereafter, this copolymer is also referred to as an "alkylated PVP").

Specific examples of the dispersant include copolymers of VP and an alkene selected from among decene, undecene, dodecene, tridecene, tetradecene, pentadecene, hexadecene, heptadecene, octadecene, nonadecene, icosene, eicosene, docosene and triacontene. Of these copolymers, copolymers with an alkene of 12 to 24 carbon atoms are preferred in terms of the dispersion stability, and the use of a VP-hexadecene copolymer, a VP-eicosene copolymer or a VP-triacontene copolymer is particularly preferred. The copolymer may include a plurality of alkenes.

From the viewpoint of suitably controlling the polarity, the copolymerization ratio (molar ratio) between VP and the alkene is preferably such that the VP:alkene ratio is at least 1.9 but less than 5.5, and more preferably within a range from 2:8 to 4:6.

The molecular weight of the alkylated PVP (the weight average molecular weight, measured using a GC method and referenced against polystyrene standards) is preferably within a range from 3,000 to 50,000, and is more preferably from 5,000 to 30,000.

In terms of commercially available products, examples of VP-hexadecene copolymers include Antaron V-216 and Ganex V-216 manufactured by ISP Co., Ltd, and Unimer U-151 manufactured by Induchem AG, whereas examples of VP-eicosene copolymers include Antaron V-220 and Ganex V-220 manufactured by ISP Co., Ltd, and Unimer U-15 manufactured by Induchem AG.

The ink may include a plurality of different alkylated PVPs.

With conventional non-aqueous pigment inks, because the ink solvent volatilizes only slowly following printing, the ink on the paper surface penetrates into the interior of the paper over time, and as a result, problems such as poor image density due to the pigment not being retained at the paper surface, and more obvious show-through tend to arise.

In contrast, in the present invention, by using the alkylated PVP described above as the pigment dispersant, printed items exhibiting good image density and no show-through can be obtained for papers having a variety of ash contents.

The ash content of a paper describes the quantity of fillers added to the paper to increase properties such as the opacity and smoothness of the paper. Examples of typically used fillers include white earth (clay), talc, calcium carbonate, titanium dioxide and aluminum hydroxide.

As the ash content increases, the opacity of the paper increases, and pigment that has penetrated into the interior of the paper is less likely to visibly color the paper surface, meaning it tends to be difficult to achieve favorable image density.

Although merely speculation at this point, the reason that the present invention yields the effects described above is thought to be as follows. Namely, the homopolymer PVP has a high polarity and does not dissolve in non-aqueous solvents, but by alkylating the polymer by conducting a copolymerization with an alkene of 10 to 40 carbon atoms, the copolymer becomes soluble in non-aqueous solvents. However, although the alkylated PVP can be dissolved in a non-aqueous solvent, it is thought that because it is also polar, the affinity of the copolymer with the non-aqueous solvent is not overly high, meaning solvent release (the separation of the pigment and the solvent) tends to occur rapidly, enabling the pigment to be readily retained at the surface of the paper. In other words, in order to disperse the pigment stably within a non-aqueous solvent, the dispersant itself must be soluble in the solvent, but on the other hand, if the affinity between the dispersant and the non-aqueous solvent is overly high, then the solvent release properties tend to deteriorate, and the pigment tends to penetrate into the interior of the paper with the solvent, resulting in reduced image density.

Using one or more other dispersants besides the alkylated PVP in combination with the alkylated PVP as the pigment dispersant is also preferred. For example, by using a dispersant that has a higher affinity with the non-aqueous solvent than the alkylated PVP (namely, a lower polarity than the alkylated PVP), the dispersion stability of the pigment within the ink can be further improved.

There are no particular restrictions on these other dispersants that may be used in combination with the alkylated PVP, provided they enable the pigment to be dispersed stably within the solvent. Examples of dispersants that can be used favorably include hydroxyl group-containing carboxylate esters, salts of long-chain polyaminoamides and high molecular weight acid esters, salts of high molecular weight polycarboxylic acids, salts of long-chain polyaminoamides and polar acid esters, high molecular weight unsaturated acid esters, high molecular weight copolymers, modified polyurethanes, modified polyacrylates, polyether ester-type anionic activators, naphthalenesulfonic acid formalin condensate salts, polyoxyethylene alkyl phosphate esters, polyoxyethylene nonylphenyl ethers, polyesterpolyamines and stearylamine acetate, and of these, the use of macromolecular (polymer) dispersants is preferred.

The total quantity of pigment dispersants, reported as a weight ratio relative to a pigment weight of 1, is preferably within a range from 0.2 to 1.0, and the quantity of the alkylated PVP relative to a pigment weight of 1 is preferably at least 0.2.

The total quantity of pigment dispersants preferably represents a blend quantity within the ink of 1 to 15% by weight, and more preferably 2 to 10% by weight.

The blend quantity of the alkylated PVP within the ink is preferably within a range from 0.5 to 15% by weight, and more preferably from 1 to 10% by weight.

The term "non-aqueous solvent" refers to non-polar organic solvents and polar organic solvents for which the 50% distillation point is at least 150° C. The "50% distillation point" is measured in accordance with JIS K0066 "Test Methods for Distillation of Chemical Products" and refers to the temperature at which 50% by weight of the solvent is evaporated.

For example, examples of preferred non-polar organic solvents include aliphatic hydrocarbon solvents, alicyclic hydrocarbon solvents and aromatic hydrocarbon solvents. Specific examples of the aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by Nippon Oil Corporation; and Isopar G, Isopar H, Isopar L, Isopar M, Exxsol D40, Exxsol D80, Exxsol D100, Exxsol D130 and Exxsol D140, all manufactured by Exxon Mobil Corporation. Specific examples of the aromatic hydrocarbon solvents include Nisseki Cleansol G (alkylbenzene) manufactured by Nippon Oil Corporation, and Solvesso 200 manufactured by Exxon Mobil Corporation.

Examples of solvents that can be used as the polar organic solvent include ester-based solvents, alcohol-based solvents, higher fatty acid-based solvents, ether-based solvents, and mixtures thereof. For example, one or more solvents selected from the group consisting of ester-based solvents composed of an ester of a higher fatty acid of 8 to 20 carbon atoms and an alcohol of 1 to 24 carbon atoms, higher alcohols of 8 to 24 carbon atoms, and higher fatty acids of 8 to 20 carbon atoms can be used favorably.

In addition to discovering that the image density could be improved by selecting a specific pigment dispersant described above, the inventors of the present invention also discovered that the type of non-aqueous solvent used also affects the image density. In other words, by incorporating a polar organic solvent within the ink, the solvent release properties of the ink can be improved, and as a result, printed items having even more favorable print densities can be provided for papers having a variety of ash contents. Particularly in those cases where the ink is used for printing to a paper having a high ash content, using an ink that includes a polar organic solvent is preferred.

Specific examples of preferred polar organic solvents include ester-based solvents such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol, oleyl alcohol, hexyldecanol, octyldodecanol and decyltetradecanol; higher fatty acid-based solvents such as nonanoic acid, isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

In those cases where a polar organic solvent is added to the ink, a preferred blend quantity is as described below. Namely, from the viewpoint of ensuring satisfactory image density on papers having an ash content of 10% or higher, the ink preferably comprises at least 10% by weight of the polar organic solvent relative to the total weight of the ink. Moreover, from the viewpoints of achieving satisfactory stability within a storage container or inside a printer, and obtaining a high density printed item that suffers no deterioration in image density over time following printing, the proportion of the polar organic solvent within the non-aqueous solvent incorporated within the ink, reported as a weight ratio, is preferably within a range from 20 to 80%.

In terms of ensuring favorable image density for papers having an even higher ash content of 20 to 30% by weight, the non-aqueous solvent preferably includes a higher fatty acid described above as the polar organic solvent. As can be seen in the examples listed above, the higher fatty acid may have a branched chain, and may include an unsaturated bond.

Higher fatty acids exhibit high polarity, and are therefore thought to have poor affinity with pigments, thereby further improving the solvent release properties. However, if the blend quantity of the higher fatty acid is too high, the solvent balance might be destroyed, causing a deterioration in the ink stability, and therefore the quantity of the fatty acid is preferably not more than 20% by weight, and more preferably within a range from 5 to 15% by weight, relative to the total weight of the non-aqueous solvent.

In addition to the components described above, the ink may also include, as required, any of the various additives typically used within the field, provided the inclusion of these additives does not impair the object of the present invention. Specific examples of these additives include anionic surfactants, cationic surfactants, amphoteric surfactants, non-ionic surfactants, or polymer-based, silicone-based or fluorine-based surfactants, which may be added to the ink as antifoaming agents or surface tension reducing agents or the like.

Examples of antioxidants that may be used include conventional antioxidants such as dibutylhydroxytoluene, propyl gal late, tocopherol, butylhydroxyanisole and nordihydroguaiaretic acid, and these may be used either alone, or in mixtures of two or more different antioxidants.

The ink can be prepared by mixing the various blend components using any appropriate dispersion device such as a ball mill or a beads mill. For example, the ink can be produced by first preparing a pigment dispersion comprising the pigment, the pigment dispersant and the non-aqueous solvent, and then adding additional non-aqueous solvent and any other optional components. The non-aqueous solvent (or diluting solvent) used during preparation of the pigment dispersion is preferably the same as the non-aqueous solvent incorporated within the ink, and in those cases where the dispersant is synthesized by solution polymerization, is preferably the same as the polymerization solvent.

The ink according to the present invention can be used favorably within an inkjet recording device. When used as an inkjet ink, the ideal range for the viscosity of the ink varies depending on factors such as the diameter of the discharge head nozzles and the discharge environment, but at 23° C. is typically within a range from 5 to 30 mPa·s, and preferably from 5 to 15 mPa·s, and is most preferably approximately 10 mPa·s. Here, the viscosity is measured at 23° C. by raising the shear stress from 0 Pa at a rate of 0.1 Pa/s, and refers to the measured value at 10 Pa.

Next is a description of a non-aqueous pigment ink set comprising a first ink and a second ink (hereafter also referred to as simply "the ink set").

The first ink of this ink set comprises a first pigment, a first pigment dispersant and a first non-aqueous solvent, and is a black ink comprising carbon black as the first pigment, and a copolymer of vinylpyrrolidone and an alkene of 10 to 40 carbon atoms (namely, an alkylated PVP) as the first pigment dispersant.

Details regarding each of the components of the first ink, including optional components and the viscosity properties, are as described above.

The second ink of the ink set comprises a second pigment, a second pigment dispersant and a second non-aqueous solvent, and is a colored ink other than black (hereafter, in this description, any ink other than black is referred to as a "colored ink") comprising a cyan, magenta or yellow pigment as the second pigment, and a nitrogen-containing graft copolymer having polyester side chains as the second pigment dispersant. Although there are no particular restrictions on the second non-aqueous solvent, the solvent preferably comprises a polar organic solvent.

Details regarding each of the components of the second ink besides the second pigment dispersant, and the viscosity properties are as described above.

The nitrogen-containing graft copolymer having polyester side chains (hereafter also referred to as the "graft PN") is a copolymer having a comb-shaped structure in which the grafted chains are polyester and the main chain is a nitrogen-containing polymer.

More specific examples include polymers comprising a main chain containing a plurality of nitrogen atoms such as a polyalkyleneimine, wherein a plurality of side chains are bonded to these nitrogen atoms via amide linkages, and these side chains are polyester chains. Examples of these types of polymers are disclosed in Japanese Patent Laid-Open No. H05-177123 (U.S. Pat. No. 4,645,611), the disclosure of which is incorporated by reference herein.

The weight average molecular weight of the nitrogen-containing polymer that constitutes the main chain is preferably not more than 600,000, and the polymer preferably comprises a plurality of side chains, with the polymerization degree of the side chains preferably within a range from 3 to approximately 80, although neither of these conditions is limiting. The main chain is preferably a polyalkyleneimine such as polyethyleneimine, and the polyalkyleneimine may be either a straight chain or a branched chain, but is preferably a branched chain. The side chains are preferably polymers composed of carbonyl-(C3 to C6-alkylene)oxy group units, and are preferably bonded to the main chain via amide linkages or salt-bridging groups.

Examples of commercial products that can be used favorably include Solsperse 28000, Solsperse 11200 and Solsperse 13940, manufactured by The Lubrizol Corporation.

Details regarding the reason that using this dispersant as the pigment dispersant for the colored ink yields the effects described for the present invention remain unclear.

The feature of this ink set is the use of a combination of a first ink that is a black ink comprising an alkylated PVP as the pigment dispersant, and a second ink that is a colored ink comprising a graft PN as the pigment dispersant. By combining the first ink (the black ink) with the second ink in this manner, black printing that has a higher density than that obtainable using only the first ink can be achieved.

Here, the expression "combining" refers to conducting printing by superimposing the two inks. The order of printing is arbitrary, and either the first ink or the second ink may be printed first.

In the following description, the ink discharged first is sometimes referred to as the "first discharge ink", and the ink discharged afterwards is sometimes referred to as the "second discharge ink." When the first discharge ink is the first ink, the second discharge ink is the second ink, whereas when the first discharge ink is the second ink, the second discharge ink will be the first ink.

In contrast, a combination different from that described above, such as a combination of a black ink comprising a graft PN as the pigment dispersant and a colored ink comprising an alkylated PVP as the pigment dispersant, a combination of a black ink comprising a graft PN as the pigment dispersant and a colored ink comprising a graft PN as the pigment dispersant, or a combination of black ink comprising an alkylated PVP as the pigment dispersant and a colored ink comprising an alkylated PVP as the pigment dispersant, is unable to produce the desired level of image density.

The ink according to the present invention and the ink set according to the present invention can be used favorably within inkjet recording systems. The inkjet printer may employ any of various printing systems, including piezo systems and electrostatic systems. In those cases where an inkjet recording apparatus is used, the ink according to the present invention is discharged from the inkjet head based on a digital signal, and the discharged ink droplets are adhered to a recording medium.

EXAMPLES

A more detailed description of the present invention is presented below based on a series of examples, although the present invention is in no way limited by these examples.

Example 1

In a 250 ml polypropylene container were mixed 30 g of carbon black, 30 g of an alkylated PVP (1), 45 g of methyl oleate, and 45 g of AF4, 450 g of zirconia beads (diameter: 0.5 mm) were then added, and the mixture was dispersed for 60 minutes using a rocking mill (manufactured by Seiwa Technical Lab Co., Ltd.), thereby yielding a dispersion. Subsequently, 40 g of this dispersion, 17 g of methyl oleate, 20 g of AF6 and 23 g of AF4 were mixed together, and the resulting mixture was filtered through a 3.0 μm membrane filter to remove any contaminants and coarse particles, thereby yielding an ink of Example 1.

Examples 2 to 9, Comparative Examples 1 to 8

Inks were prepared in the same manner as Example 1 described above, using the formulations shown in Table 1.

In Table 1, the blend components used were as follows.

Carbon black: MA8, manufactured by Mitsubishi Chemical Corporation

Copper phthalocyanine: phthalocyanine blue, manufactured by Sanyo Color Works, Ltd.

Alkylated PVP (1): V216 (VP-hexadecene copolymer, copolymerization ratio 2:8, weight average molecular weight: $14 \times 10^3$), manufactured by ISP Japan Ltd.

Alkylated PVP (2): V220 (VP-eicosene copolymer, copolymerization ratio 2:8, weight average molecular weight: $17 \times 10^3$), manufactured by ISP Japan Ltd.

Solsperse 11200: manufactured by The Lubrizol Corporation, solid fraction within an aliphatic solvent: 50% by weight (the blend quantity in Table 1 represents a solid fraction quantity)

Solsperse 28000: manufactured by The Lubrizol Corporation, solid fraction: 100%

Solsperse 13940: manufactured by The Lubrizol Corporation, solid fraction within an aliphatic solvent: 40% by weight (the blend quantity in Table 1 represents a solid fraction quantity)

Methyl oleate: Exceparl M-OL, manufactured by Kao Corporation

Oleic acid: reagent grade, manufactured by Wako Pure Chemical Industries, Ltd.

Isomyristyl alcohol: FOC140N, manufactured by Nissan Chemical Industries, Ltd.

AF6: AF solvent No. 6 (naphthene-based solvent), manufactured by Nippon Oil Corporation AF4: AF solvent No. 4 (naphthene-based solvent), manufactured by Nippon Oil Corporation

TABLE 1

Ink Formulations and Evaluations

| | | | Example 1 | Example 2 | Example 3 | Example 4 | Example 5 | Example 6 | Example 7 | Example 8 | Example 9 |
|---|---|---|---|---|---|---|---|---|---|---|---|
| | | | I-1 | I-2 | I-3 | I-4 | I-5 | I-6 | I-7 | I-8 | I-9 |
| Ink component blend quantity (parts by weight) | Pigment | Carbon black | 8.0 | 8.0 | 8.0 | 8.0 | 8.0 | 8.0 | 8.0 | 8.0 | |
| | | Copper phthalocyanine | | | | | | | | | 8.0 |
| | Pigment dispersant | Alkylated PVP (1) | 8.0 | 8.0 | 8.0 | 8.0 | 8.0 | | | 8.0 | 8.0 |
| | | Alkylated PVP (2) | | | | | | 8.0 | 8.0 | | |
| | | Solsperse 11200 | | | | | | | | | |
| | | Solsperse 28000 | | | | | | | | | |
| | | Solsperse 13940 | | | | | | | | | |
| | Polar solvent | Methyl oleate | 29.0 | | 49.0 | 44.0 | 34.0 | 49.0 | 34.0 | | 49.0 |
| | | Oleic acid | | 15.0 | | 5.0 | 15.0 | | 15.0 | | |
| | | Isomyristyl alcohol | | | | | | | | | |
| | Non-polar solvent | AF6 | 20.0 | 34.0 | | | | | | 49.0 | |
| | | AF4 | 35.0 | 35.0 | 35.0 | 35.0 | 35.0 | 35.0 | 35.0 | 35.0 | 35.0 |
| | | Total | 100.0 | 100.0 | 100.0 | 100.0 | 100.0 | 100.0 | 100.0 | 100.0 | 100.0 |
| Image density | | Riso lightweight paper (ash content: 9%) | AA | AA | AA | AA | AA | AA | AA | A | A |

TABLE 1-continued

Ink Formulations and Evaluations

| | | | | | | | | | |
|---|---|---|---|---|---|---|---|---|---|
| Xerox Business Multipurpose 4200 (ash content > 15%) | B | A | B | A | A | B | A | C | B |
| Hammer Mill 96 (ash content > 20%) | B | A | B | A | A | B | A | C | B |
| HC paper IJ (ash content > 25%) | B | A | B | A | A | B | A | C | B |

| | | | Comparative example | | | | | | | |
|---|---|---|---|---|---|---|---|---|---|---|
| | | | 1 | 2 | 3 | 4 | 5 | 6 | 7 | 8 |
| | | | | | | Ink number | | | | |
| | | | I-10 | I-11 | I-12 | I-13 | I-14 | I-15 | I-16 | I-17 |
| Ink component blend quantity (parts by weight) | Pigment | Carbon black | 8.0 | 8.0 | 8.0 | 8.0 | 8.0 | | | |
| | | Copper phthalocyanine | | | | | | 8.0 | 8.0 | 8.0 |
| | Pigment dispersant | Alkylated PVP (1) | | | | | | | | |
| | | Alkylated PVP (2) | | | | | | | | |
| | | Solsperse 11200 | 8.0 | 8.0 | 8.0 | 8.0 | 8.0 | 8.0 | | |
| | | Solsperse 28000 | | | | | | | | 5.0 |
| | | Solsperse 13940 | | | | | | | 8.0 | 3.0 |
| | Polar solvent | Methyl oleate | 29.0 | | 49.0 | 34.0 | | 49.0 | 49.0 | 39.0 |
| | | Oleic acid | | 15.0 | | 15.0 | | | | |
| | | Isomyristyl alcohol | | | | | | | | 10.0 |
| | Non-polar solvent | AF6 | 20.0 | 34.0 | | | 49.0 | | | |
| | | AF4 | 35.0 | 35.0 | 35.0 | 35.0 | 35.0 | 35.0 | 35.0 | 35.0 |
| | | Total | 100.0 | 100.0 | 100.0 | 100.0 | 100.0 | 100.0 | 100.0 | 100.0 |
| Image density | | Riso lightweight paper (ash content: 9%) | C | B | B | B | C | C | C | C |
| | | Xerox Business Multipurpose 4200 (ash content > 15%) | C | C | C | C | C | C | C | C |
| | | Hammer Mill 96 (ash content > 20%) | C | C | C | C | C | C | C | C |
| | | HC paper IJ (ash content > 25%) | C | C | C | C | C | C | C | C |

<Measurement of Viscosity>

The viscosity of each of the obtained inks (namely, the viscosity at 10 Pa when the shear stress was raised from 0 Pa at a rate of 0.1 Pa/s at a temperature of 23° C.) was measured using a controlled stress rheometer RS75 manufactured by Haake GmbH (cone angle: 1°, diameter: 60 mm).

The results showed that each of the inks had a viscosity within a range from 8 to 12 mPa·s, which is an ideal viscosity for use in inkjet printing.

Moreover, all of the obtained inks had a pigment particle size that fell within the preferred range for inkjet printing.

<Image Density>

An HC5500 device (manufactured by Riso Kagaku Corporation) was used as the inkjet recording apparatus. The HC5500 is a system that uses a 300 dpi line-type inkjet head (in which the nozzles are aligned with an approximately 85 μm spacing therebetween), wherein the paper is transported in a sub-scanning direction perpendicular to the main scanning direction (the direction along which the nozzles are aligned) while printing is conducted.

Each ink was loaded into the inkjet recording apparatus, and a solid image was printed onto each of the printing papers of different ash content shown in Table 1 using liquid droplets of 42 pl. After standing for 24 hours, the image density was evaluated by measuring the OD value for the image. The ash content refers to the value determined using the measurement method of JIS P8251 (Paper, board and pulps—Determination of ash on ignition at 525° C.).

The image density value (OD value) was measured using a Macbeth densitometer (RD920, manufactured by Macbeth Corporation). The evaluation criteria are shown in Table 2.

The results of the evaluations are shown above in Table 1.

TABLE 2

Evaluation Criteria for Image Density

| Black ink | | Cyan ink | | Ink set | |
|---|---|---|---|---|---|
| Evaluation | OD value | Evaluation | OD value | Evaluation | OD value |
| AA | >1.15 | AA | >1.15 | AA | >1.20 |
| A | >1.10 | A | >1.10 | A | >1.15 |
| B | 1.05 to 1.10 | B | 1.05 to 1.10 | B | 1.10 to 1.15 |
| C | <1.05 | C | <1.05 | C | <1.10 |

The printed items obtained using the inks of the examples had high image densities.

Moreover, when each of the inks was placed inside a sealed container and stored for one month in an atmosphere at 60° C., and the viscosity was then re-measured, all of the inks exhibited a variation in viscosity from the initial value of less than 5%, confirming that the stability of the inks, including the pigment dispersibility, was favorable.

In contrast, with the inks of the comparative examples, satisfactory image densities could not be obtained. In terms of ink stability, the inks of the comparative examples also exhibited favorable results.

Examples 10 to 14, Comparative Examples 9 to 14

Next is a description of examples of ink sets.

Using each of the ink sets shown in Table 3, a solid image similar to that described above was printed by discharging the first discharge ink and the second discharge ink in that order, and the image density was then evaluated.

The results are shown in Table 3.

TABLE 3

Evaluation of Ink Sets

|  |  | Example | | | | | Comparative example | | | | | |
| --- | --- | --- | --- | --- | --- | --- | --- | --- | --- | --- | --- | --- |
|  |  | 10 | 11 | 12 | 13 | 14 | 9 | 10 | 11 | 12 | 13 | 14 |
|  | First discharge ink (ink number from Table 1) | I-15 | I-3 | I-16 | I-17 | I-17 | I-15 | I-16 | I-17 | I-9 | I-17 | I-9 |
|  | Second discharge ink (ink number from Table 1) | I-3 | I-15 | I-6 | I-5 | I-8 | I-12 | I-13 | I-12 | I-3 | I-14 | I-12 |
| Image density | Riso lightweight paper (ash content: 9%) | AA | AA | AA | AA | AA | C | C | C | C | C | C |
|  | Xerox Business Multipurpose 4200 (ash content > 15%) | B | B | B | A | C | C | C | C | C | C | C |
|  | Hammer Mill 96 (ash content > 20%) | B | B | B | A | C | C | C | C | C | C | C |
|  | HC paper IJ (ash content > 25%) | B | B | B | A | C | C | C | C | C | C | C |

As is evident in the examples shown in Table 3, when printing was conducted using a combination of a black ink comprising an alkylated PVP as the dispersant (ink numbers I-3, I-6, I-5 and I-8) and a colored (blue) ink comprising a graft PN as the dispersant (ink numbers I-15, I-16 and I-17), a high image density was obtained regardless of the ink discharge order.

In contrast, in the case of inks in which the combination of the pigment dispersant and the pigment were other than those described above, namely, ink sets of the comparative examples that used a black ink comprising a graft PN as the dispersant (ink numbers I-12, I-13 and I-14) and a colored ink comprising an alkylated PVP as the dispersant (ink number I-9), the image density values were low.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous ink set, comprising:
   a first ink comprising a first pigment, a first pigment dispersant and a first non-aqueous solvent; wherein
   the first pigment comprises carbon black, and
   the first pigment dispersant comprises a copolymer of vinylpyrrolidone and an alkene of 10 to 40 carbon atoms; and
   a second ink comprising a second pigment, a second pigment dispersant and a second non-aqueous solvent; wherein
   the second pigment comprises a cyan, magenta or yellow pigment, and
   the second pigment dispersant comprises a nitrogen-containing graft copolymer having polyester side chains.

2. The non-aqueous pigment ink set according to claim 1, wherein the first non-aqueous solvent comprises a polar organic solvent.

3. The non-aqueous pigment ink set according to claim 2, wherein the polar organic solvent present in an amount of at least 10% by weight, relative to the total weight of the ink.

4. The non-aqueous pigment ink set according to claim 2, wherein the polar organic solvent comprises one or more solvents selected from the group consisting of ester-based solvents composed of an ester of a higher fatty acid of 8 to 20 carbon atoms and an alcohol of 1 to 24 carbon atoms, higher alcohols of 8 to 24 carbon atoms, and higher fatty acids of 8 to 20 carbon atoms.

5. The non-aqueous pigment ink set according to claim 3, wherein the polar organic solvent comprises one or more solvents selected from the group consisting of ester-based solvents composed of an ester of a higher fatty acid of 8 to 20 carbon atoms and an alcohol of 1 to 24 carbon atoms, higher alcohols of 8 to 24 carbon atoms, higher fatty acids of 8 to 20 carbon atoms, and higher fatty acids of 8 to 20 carbon atoms.

* * * * *